US012023595B2

(12) United States Patent
Gibson et al.

(10) Patent No.: US 12,023,595 B2
(45) Date of Patent: Jul. 2, 2024

(54) CHAIR SLED ATTACHMENT ASSEMBLY AND ATTACHMENT METHOD FOR GAMING MACHINES

(71) Applicant: Everi Games Inc., Austin, TX (US)

(72) Inventors: Daniel Gibson, Austin, TX (US); Ryan Greene, Austin, TX (US); Craig Gallagher, Austin, TX (US); Steven Speer, Austin, TX (US); Travis Bussey, Austin, TX (US)

(73) Assignee: Everi Games Inc., Austin, TX (US)

( * ) Notice: Subject to any disclaimer, the term of this patent is extended or adjusted under 35 U.S.C. 154(b) by 100 days.

(21) Appl. No.: 17/962,534

(22) Filed: Oct. 9, 2022

(65) Prior Publication Data

US 2024/0115961 A1 Apr. 11, 2024

(51) Int. Cl.
*A63F 13/90* (2014.01)

(52) U.S. Cl.
CPC .................................... *A63F 13/90* (2014.09)

(58) Field of Classification Search
CPC ....................................................... A63F 13/90
See application file for complete search history.

(56) References Cited

U.S. PATENT DOCUMENTS 6,354,660 B1 * 3/2002 Friedrich ................ A63F 13/24 248/500
8,000,484 B2 * 8/2011 Rasmussen .............. A47C 7/72 381/301
2002/0070589 A1 * 6/2002 Laufer ..................... A47C 9/06 297/14
2008/0039215 A1 * 2/2008 Hahn ..................... A47C 9/022 463/47
2009/0146484 A1 * 6/2009 Mittler ................. A47C 15/004 297/463.1
2009/0179479 A1 * 7/2009 Davis, Jr. ............. A47C 15/004 297/463.1
2012/0282997 A1 * 11/2012 Miner ................. G07F 17/3216 463/25

* cited by examiner

*Primary Examiner* — James S. McClellan
(74) *Attorney, Agent, or Firm* — The Culbertson Group, P.C.; Russell D. Culbertson

(57) ABSTRACT

A chair sled attachment assembly includes a base structure, a support bracket, and a base access panel. The base structure is connected to a gaming machine cabinet in a base position projecting in a front direction from a front side of the cabinet and defines a base volume separate from a secure volume of the cabinet. The base structure also defines a base access opening to provide access to the base volume. The support bracket is located within the base volume adjacent to the base access opening and includes a support bracket connecting arrangement to which a chair sled receiver is connectable in a chair sled receiver operating position. The base access panel is removably secured to the base structure in a cover position substantially covering the base access opening.

17 Claims, 10 Drawing Sheets

118 500 200a 506 504 508 502 201 612 200b 604 201 120 102 104 107 106

118 500 200a 508 802 800 200b 604 804 802 120 102 104 107 106

CHAIR SLED ATTACHMENT ASSEMBLY AND ATTACHMENT METHOD FOR GAMING MACHINES

TECHNICAL FIELD OF THE INVENTION

This disclosure relates to attachment assemblies that may be used to connect a chair sled to a gaming machine and to methods for attaching a chair sled to a gaming machine.

BACKGROUND OF THE INVENTION

Electronic gaming machines such as mechanical and video reel-type gaming machines, video poker gaming machines, and other types of gaming machines, are commonly designed to be played by a player seated in front of the gaming machine. To ensure the intended player chair is always available at a gaming machine (and not moved away for use elsewhere), gaming machines commonly include a player chair that is physically connected to the gaming machine cabinet. Some locations that offer play at electronic gaming machines require that a player chair be physically connected to the gaming machine cabinet.

In view of the common requirement for a player chair to be physically connected to the gaming machine cabinet, a standard connecting arrangement has developed for providing the connection. The standard connecting arrangement includes a chair sled assembly having a player chair secured to an elongated chair sled base. The chair is secured to the chair sled base generally near a distal end of the chair sled base opposite to a proximal end adapted to be connected to the gaming machine. The chair sled base proximal end is configured to be received in a connected position in a chair sled receiver that is itself connected to the gaming machine. The chair sled receiver includes a releasable lock that is adapted to receive an element at the chair sled base proximal end to lock the chair sled in the connected position. A release key may be used to release the lock so that the chair sled base may be removed from the gaming machine as needed for maintenance or other purposes. The standard connecting arrangement allows a gaming machine chair needing service to be removed and replaced with a new or refurbished chair while still reasonably securing the gaming machine chair to the gaming machine as desirable or necessary.

SUMMARY OF THE INVENTION

It is an object of the invention to provide a chair sled attachment assembly that retains the standard chair sled connection while providing ready access to the chair sled receiver so that the chair sled assembly may be easily removed and/or attached with minimal interruption to gaming activity at the gaming machine. Other objects of the invention include providing a gaming machine incorporating such a chair sled attachment assembly, while further objects include methods for attaching a chair sled to a gaming machine.

A chair sled attachment assembly according to a first aspect of the present invention is adapted for use with a gaming machine that includes a cabinet having a secure access arrangement for providing access to a secure volume of the cabinet. Such a chair sled attachment assembly includes a base structure, a support bracket, and a base access panel. The base structure is connected to the cabinet in a base position projecting in a front direction from a front side of the cabinet and defines a base volume separate from the secure volume of the cabinet. The base structure also defines a base access opening to provide access to the base volume. The support bracket is located within the base volume adjacent to the base access opening and includes a support bracket connecting arrangement to which a chair sled receiver is connectable in a chair sled receiver operating position. The base access panel is removably secured to the base structure in a cover position substantially covering the base access opening.

A chair sled attachment assembly according to this first aspect of the invention has the advantage of providing access to the chair sled receiver for replacing a chair sled without having to open the secure volume of the gaming machine cabinet. This enhances security while reducing the time needed for replacing the chair sled and while retaining the standard chair sled and chair sled receiver arrangement.

A second aspect of the invention encompasses gaming machines on which a chair sled assembly according to the first aspect of the invention is installed.

In implementations according to either of the first or second aspects of the invention, the chair sled attachment assembly may further include an access panel brace. In these implementations, the support bracket connecting arrangement is adapted to be connectable to the access panel brace alternatively to the chair sled receiver. The access panel brace may include a bracing member that projects in the front direction from the support bracket when the access panel brace in connected to the support bracket connecting arrangement. When installed on the support bracket, the access panel brace may provide additional structural support for the base access panel.

Some implementations according to the first or second aspects of the invention may include a support bracket connecting arrangement that allows the chair sled receiver to be directly connected to the support bracket. Other implementations may use a receiver adapter to allow the chair sled receiver to be connected through the support bracket connecting arrangement.

Embodiments according to the first and second aspects of the invention may further include a sled cover adapted to be removably secured to the base structure in a sled cover position covering at least a portion of the base access opening when the chair sled receiver is connected in the chair sled receiver operating position. The sled cover may be used in place of the base access panel when the chair sled receiver is installed on the support bracket. Such a sled cover may be used in lieu of the base access panel in implementations where the chair sled receiver protrudes from the base volume when connected in the chair sled receiver operating position. In these cases the installed sled cover may have a rear edge that substantially abuts a front edge of the chair sled receiver.

A third aspect of the invention encompasses methods for attaching a chair sled to a gaming machine. A method according to this third aspect of the invention includes removing a base access panel from a cover position on a base structure of a gaming machine. The base structure projects in a front direction from a front side of the cabinet and defines a base volume separate from a secure volume defined within the gaming machine cabinet. The method further includes securing a chair sled receiver in a chair sled receiver operating position on a support bracket located within the base volume. The support bracket is positioned in the base volume adjacent to a base access opening exposed by removing the base access panel. With the base access panel removed and the chair sled receiver in the chair sled receiver operating position, the method further includes inserting a connecting end of the chair sled to a locked position within the chair sled receiver. Some implementations may further include securing a sled cover over at least a portion of the base access opening after the chair sled is placed in its locked position.

For implementations of a method in accordance with this third aspect of the invention where and access panel brace is included with the support bracket for helping to support the base access panel, the method may further include removing the access panel brace from the support bracket prior to securing the chair sled receiver. Additionally, some implementations may include first securing a receiver adapter bracket to the support bracket prior to securing the chair sled receiver in the chair sled receiver operating position.

These and other aspects, advantages, and features of the invention will be apparent from the following description of representative embodiments, considered along with the accompanying drawings.

DESCRIPTION OF REPRESENTATIVE EMBODIMENTS

Figure 1:
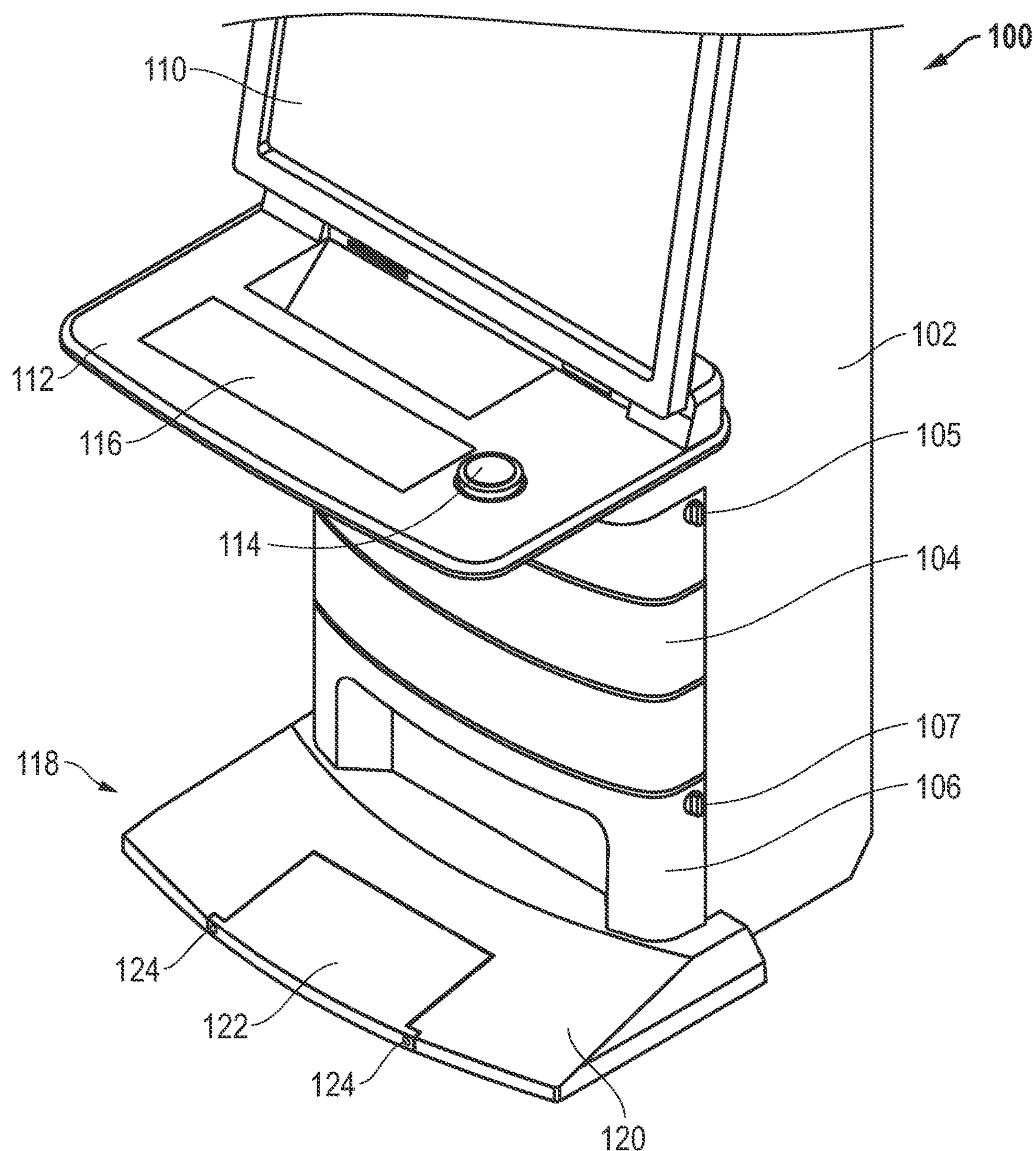
FIG. 1 is an isometric view of a lower portion of a gaming machine that incorporates a chair sled attachment assembly in accordance with aspects of the present invention.

FIG. 1 shows a lower portion of a gaming machine 100 incorporating an example embodiment of a chair sled attachment assembly in accordance with the present invention. Gaming machine 100 includes a cabinet 102 on which is mounted a video display device 110 and a button deck 112. Button deck 112 contains player controls including in this example a play button 114 and a touchscreen button panel 116.

Gaming machine 100 also includes a first cabinet access panel 104 and a second cabinet access panel 106. Each of these cabinet access panels 104 and 106 are adapted to be removed or opened from the position shown in FIG. 1 to provide access to a secure volume of the cabinet 102. The secure volume of cabinet 102 is intended for access only to authorized personnel for servicing and configuring the gaming machine and thus each cabinet access panel is associated with a locking device that may be keyed or otherwise configured for operation only by authorized personnel. In this example gaming machine 100, first cabinet access panel 104 includes a first locking device 105 and second cabinet access panel 106 includes a second locking device 107. The two cabinet access panels 104 and 106 and their respective locking device, 105 and 107, together form a secure access arrangement for providing access to the secure volume defined within cabinet 102. This secure volume may house processing devices and storage devices for operational software that controls the operation of gaming machine 100 and thus must be kept secured to prevent tampering with gaming machine operation.

The example chair sled attachment assembly shown in FIG. 1 and the following figures includes a base structure shown generally at reference numeral 118. Base structure 118 is connected to cabinet 102 in a base position projecting in a front direction from a front side of the cabinet. Base structure 118 includes a cover 120 that covers various structural members of the base structure that may be connected to structural members of the gaming machine cabinet 102. Cover 120 also defines a base volume within base structure 118.

FIG. 1 shows that base structure 118 includes a base access panel 122 secured in a cover position on the rest cover 120. In this example implementation base access panel 122 may be secured in place by suitable fasteners through fastener openings 124 in FIG. 1. These fastener openings 124 may allow a threaded fastener to be threaded into a suitable threaded receiver either formed on cover 120 or structural members within cover 120. The base volume may be accessed through an excess opening shown in FIG. 1 covered by base access panel 122.

Figure 2:
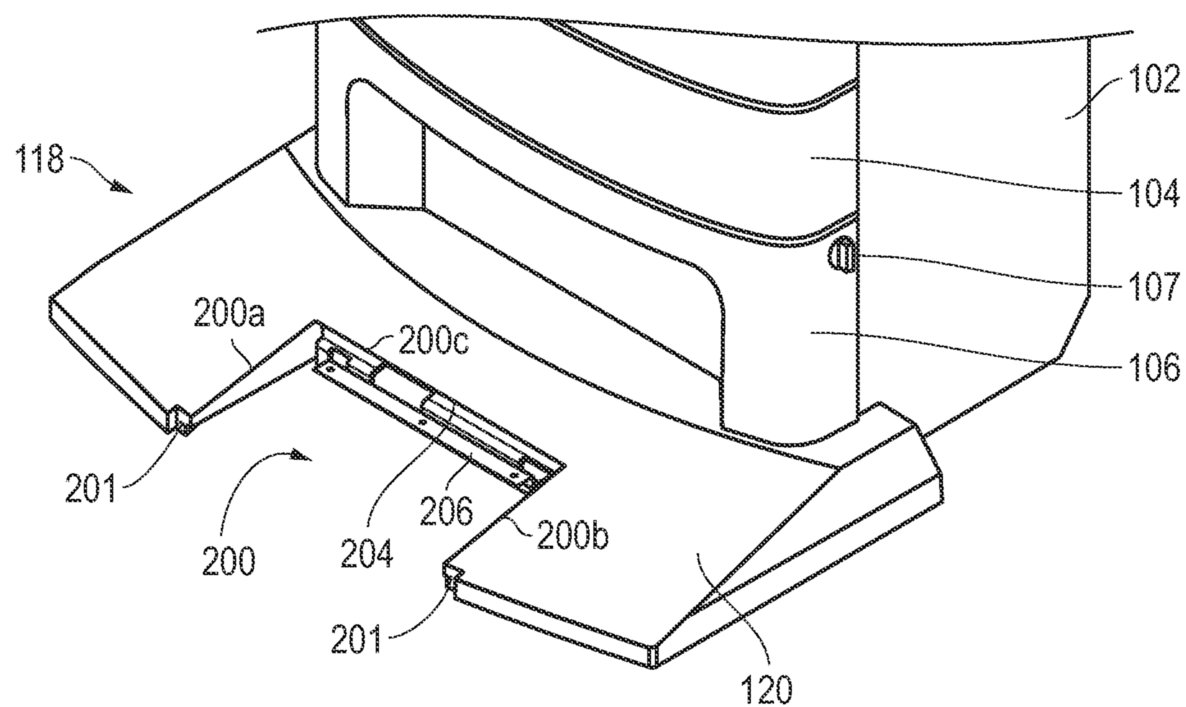
FIG. 2 is an isometric view of the base structure shown in FIG. 1 but showing a base access panel removed from its cover position.

FIG. 2 shows the condition of base structure 118 with base access panel 122 removed from the cover position shown in FIG. 1 to expose the base access opening shown generally at reference numeral 200 in FIG. 2. This base access opening 200 is defined by lateral edges 200*a* and 200*b*, and back edge 200*c*, and comprises an opening in base cover 120 to expose the base volume defined by base structure 118. FIG. 2 shows fastener openings 201 in base structure 118 along with a support bracket 204. Support bracket 204 may form part of or may be connected to the structural members concealed under cover 120. This example implementation also includes an access panel brace 206 shown in FIG. 2 connected to support bracket 204. Access panel brace 206 in this example provides a horizontal bracing member that projects in the front direction from support bracket 204 in position to provide structural support from the underside of base access panel 122 when the base access panel 122 is in the cover position shown in FIG. 1.

Figure 3:
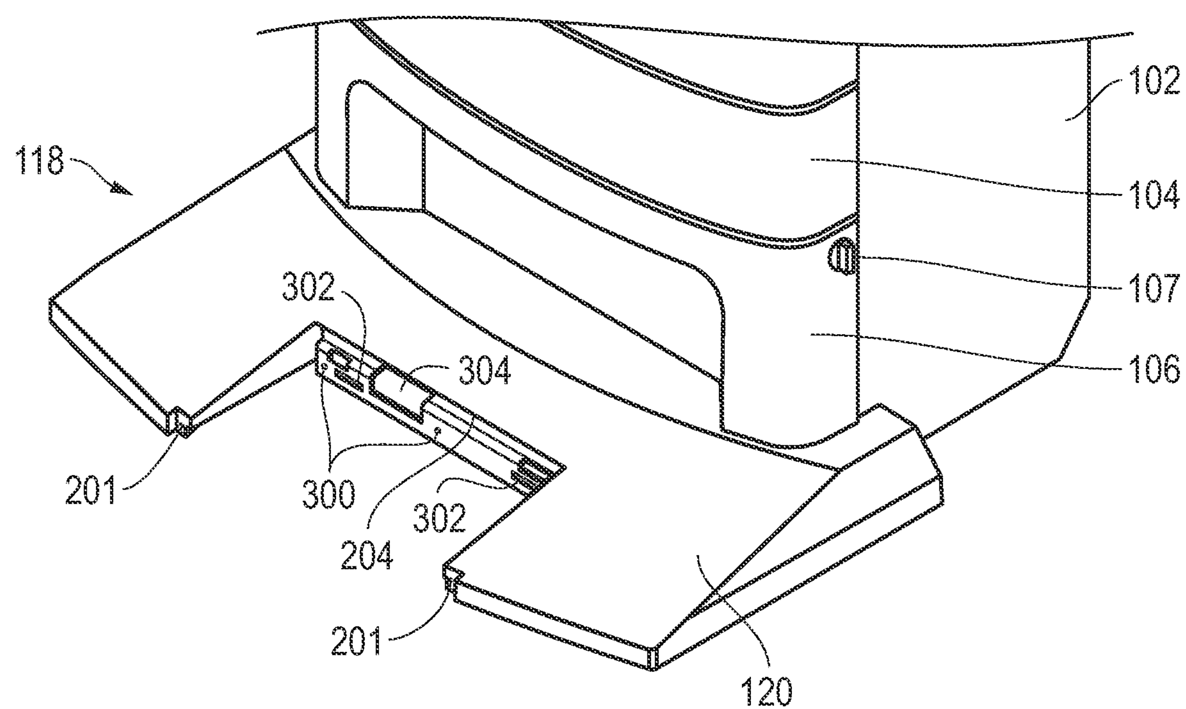
FIG. 3 is an isometric view similar to FIG. 2 but showing the access panel brace removed from the support bracket.

FIG. 3 shows the condition of base structure 118 with access panel brace 206 removed from its secured position on support bracket 204. Example support bracket 204 includes fastener receivers 300, slot openings 302, and a cutout 304. Fastener receivers 300 may be threaded openings for receiving suitable fasteners to fasten access panel brace 206 or other components to the front side of support bracket 204. Slots 302 may receive extensions from a component such as access panel brace 206 when connected to support bracket 204 to enhance the structural connection to the support bracket 204. Cutout 304 exposes an area that may include electrical connectors or plugs. Although not shown in these illustrations, the purpose of such electrical connectors or plugs will be described further below in connection with the chair sled assembly.

Figure 4:
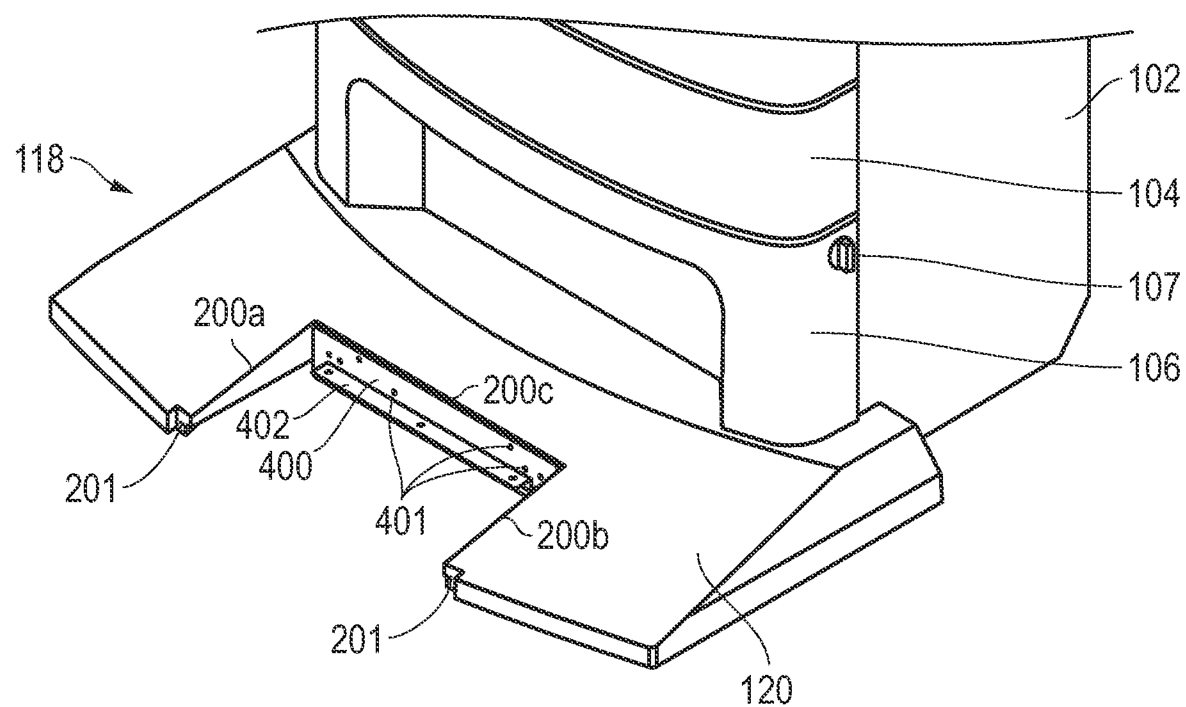
FIG. 4 is an isometric view similar to FIG. 3 but with a receiver adapter connected to the support bracket.

FIG. 4 shows the condition of the example chair sled attachment assembly with an adapter 400 is secured to support bracket 204. Adapter 400 is included in this example to provide appropriate connection points for a chair sled receiver as will be described further below. Other implementations of the invention may include appropriate attachment structure built into support bracket 204 and thus obviate the need for an adapter such as adapter 400. The example adapter 400 includes fastener openings 401 that may align with fastener openings 300 on support bracket 204 shown in FIG. 3. Example adapter 400 shown in FIG. 4 also includes an adapter brace 402 protruding in the forward direction and adapted to cooperate with the chair sled receiver as will be described below. It should be noted that example adapter 400 does not include an opening in position to align with cutout 304 on support bracket 204. Thus adapter 400 is not suitable for use where electrical connections are needed in this area. Alternative adapters may include an opening adapted to align with cutout 304 to facilitate electrical connections.

Figure 5:
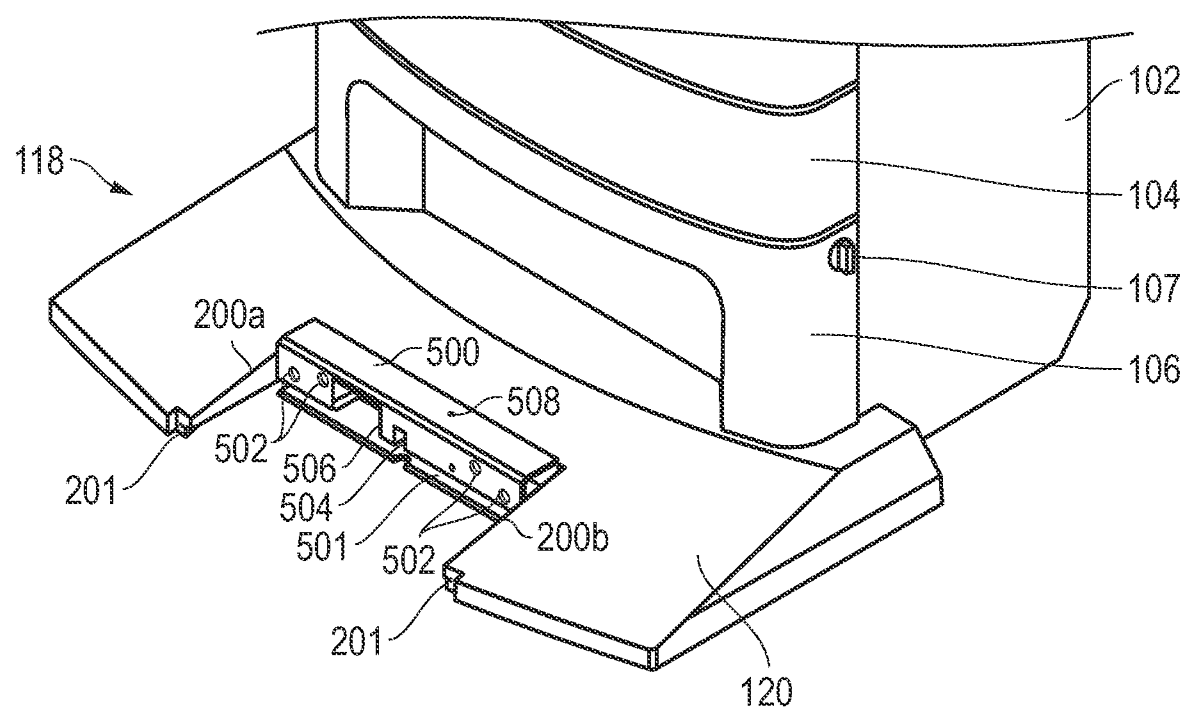
FIG. 5 is an isometric view similar to FIG. 4 but with a chair sled receiver connected in the operating position on the support bracket.

FIG. 5 shows a chair sled receiver 500 connected in a chair sled receiver operating position on support bracket 204 (the bracket 204 being concealed by receiver 500 in FIG. 5 and thus not visible in this figure). In this example chair sled receiver 500 is connected to support bracket 204 via adapter 400 shown in FIG. 4. Chair sled receiver 500 comprises a standard component for securing a standard chair sled assembly (which will be described below in connection with FIG. 6) and includes an elongated receiver slot 501 for receiving a portion of the chair sled assembly. Chair sled receiver 500 also includes fastener access openings 502 providing access to fastener openings (not shown) at a rear side of the receiver 500. Chair sled receiver 500 also includes a pin receiving slot 504 and electrical plug receiving area shown generally at 506. Although not shown in these figures, chair sled receiver 500 includes a locking mechanism associated with pin receiver slot 504. As will be described further below, this locking mechanism cooperates with a locking pin of the chair sled assembly to lock the chair sled assembly in its installed operating position in receiver 500. The illustrated chair sled receiver 500 also includes a release mechanism opening 508 for receiving a tool adapted to release the locking mechanism within the chair sled receiver 500 to allow the chair sled assembly to be removed from its installed position.

Figure 6:
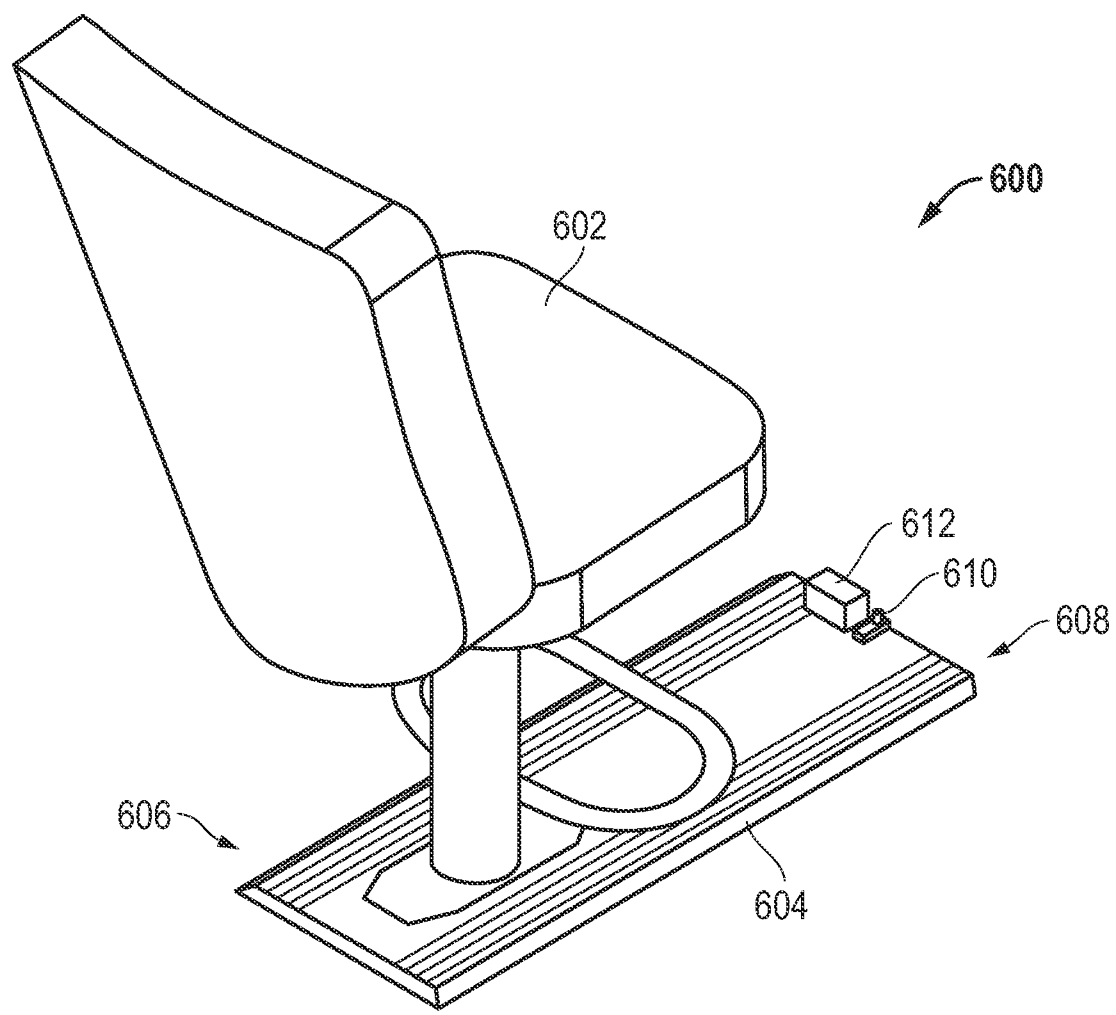
FIG. 6 is an isometric view of a prior art chair sled assembly.

Referring now to FIG. 6, a standard chair sled assembly 600 includes a chair 602 and a chair sled base 604. Chair sled base 604 has a distal end shown generally at 606 and a proximal end or connecting end shown generally at 608. A locking pin 610 is connected at the chair sled base proximal end 608 adjacent to an electrical connection box 612. Electrical connection box 612 may include electrical plugs or connectors for providing an electrical connection to electronic elements that may be included on chair sled assembly 600 such as lighting elements, speakers, and/or haptic feedback elements (not shown).

Figure 7:
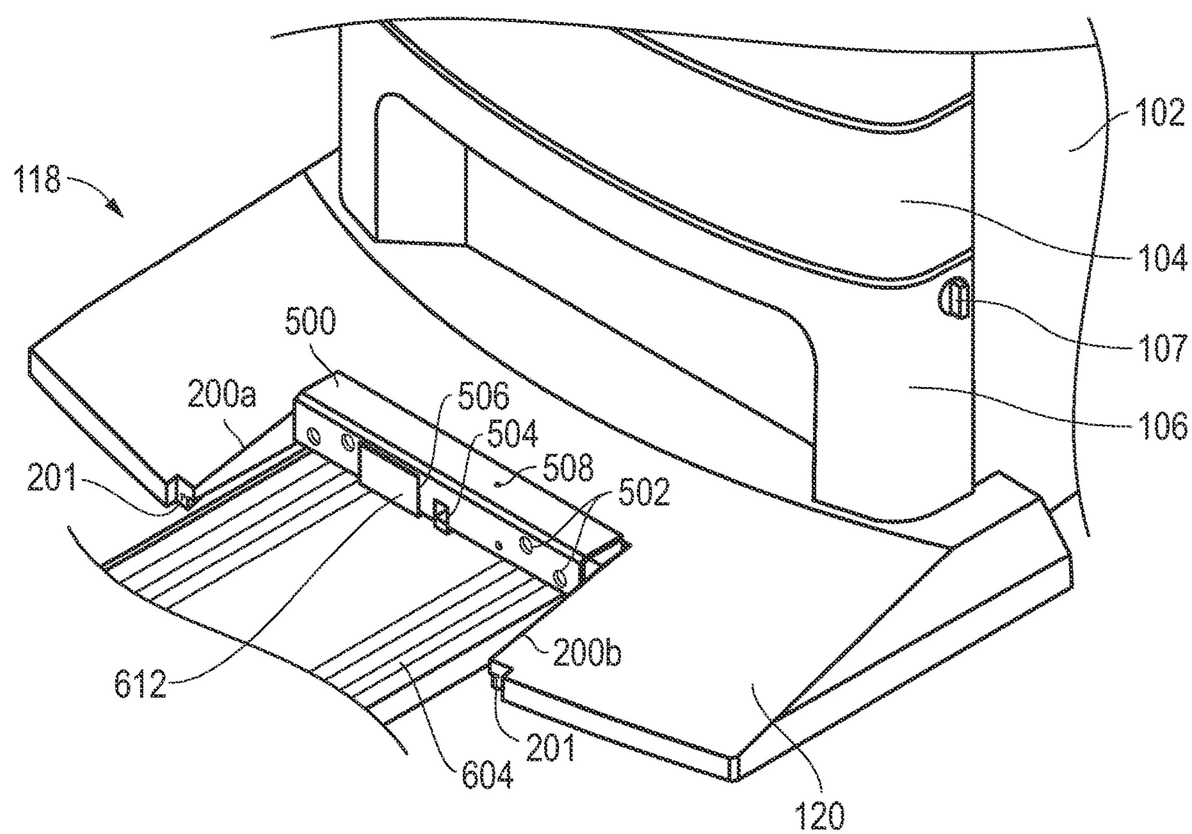
FIG. 7 is an isometric view similar to FIG. 5 but with the proximal end of the chair sled base received in the chair sled receiver.

FIG. 7 shows a portion of chair sled base 604 with the proximal end 608 connected in an operating position with chair sled receiver 500. In this position locking pin 610 (shown in FIG. 6) is received in pin receiver slot 504 and locked in position with the locking mechanism housed within receiver 500. In this operating position, electrical connector box 612 is received in electrical connection receiver area 506 of receiver 500.

Figure 8:
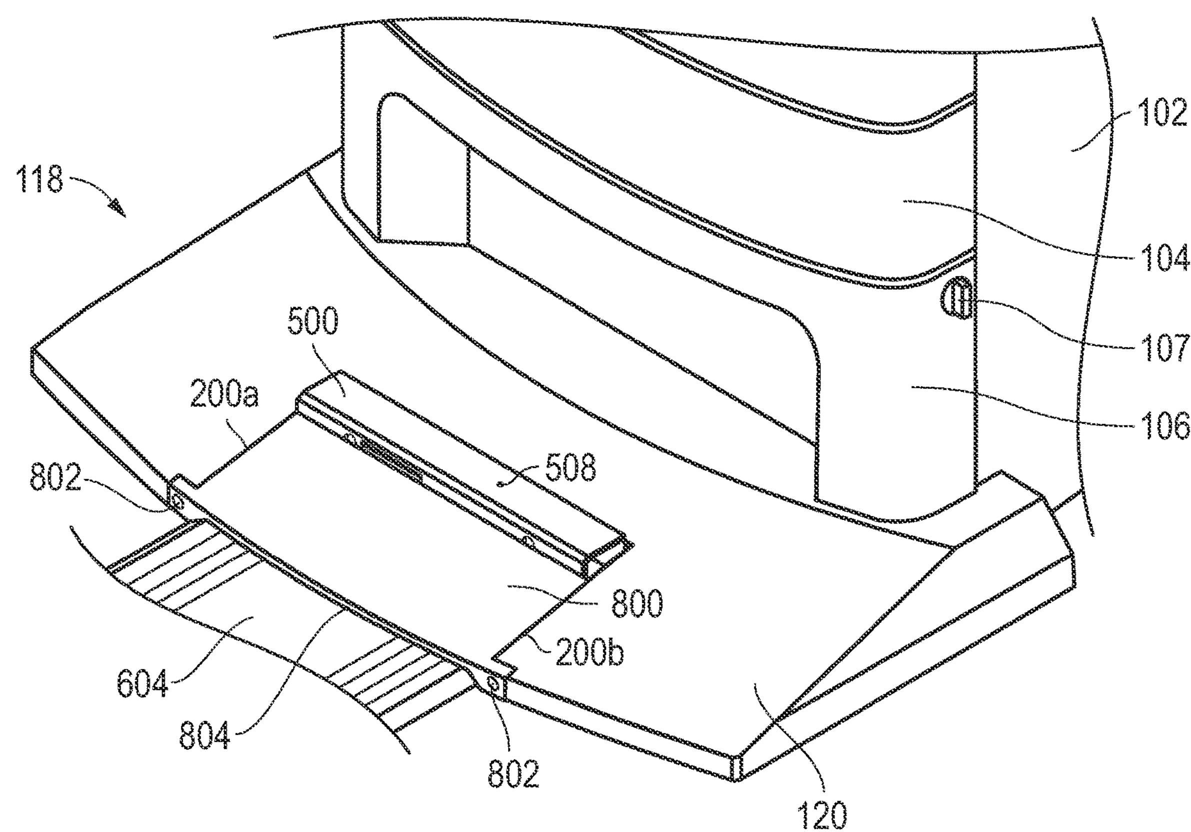
FIG. 8 is an isometric view similar to FIG. 7 but with the sled cover connected in its installed position on the base structure.

FIG. 8 shows that a sled cover 800 may be connected over the received chair sled base 604 to cover at least a portion of the base access opening defined between opening edges 200*a* and 200*b* in FIG. 8. Sled cover 800 includes fastener openings 802 to allow the sled cover 800 to be secured in the position shown in FIG. 8 using fasteners and the openings 201 in the base structure 118 shown in FIGS. 2 through 5. Sled cover 800 also includes a recessed area 804 along the front edge to accommodate the thickness of chair sled base 604. In this particular example, an upper part of chair sled receiver 500 protrudes out of a rear portion of the base access opening and thus chair sled cover 800 does not extend the entire depth of the base access opening (200 in FIG. 2). Rather, a rear edge of sled cover 800 generally abuts a front surface of chair sled receiver 500. It will be appreciated that other implementations of a chair sled attachment assembly in accordance with aspects of the present invention may include a base structure that allows the entire chair sled receiver 500 to be received in the base volume. In implementations such as that shown in FIG. 8, the sled cover 800 may include a portion that extends over the protruding part of chair sled receiver 500 to conceal the chair sled receiver at least from the front of the gaming machine 100. Other implementations may dispense with sled cover 800 and leave chair sled receiver 500 and chair sled base 604 exposed in operation of the gaming machine, generally in the condition shown in FIG. 7.

Figure 9:
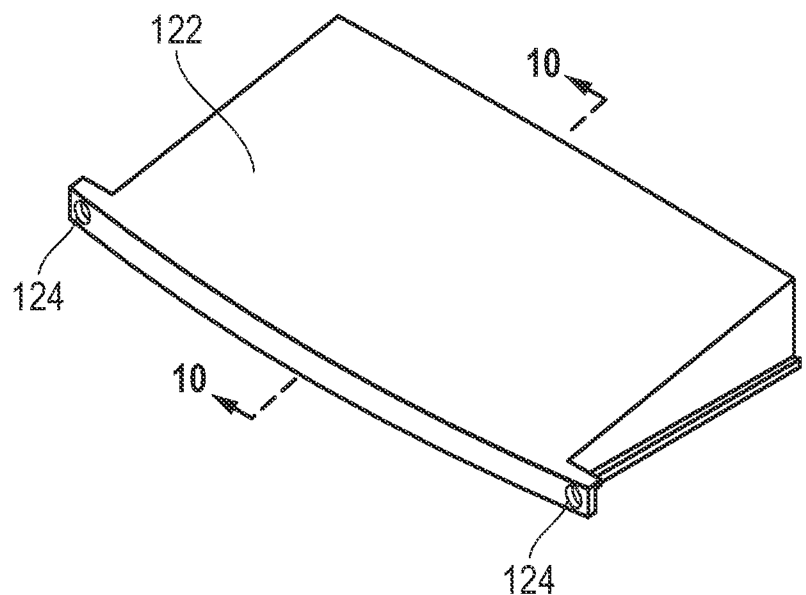
FIG. 9 is an isometric view of the base access panel shown in FIGS. 1 and 2.
Figure 10:
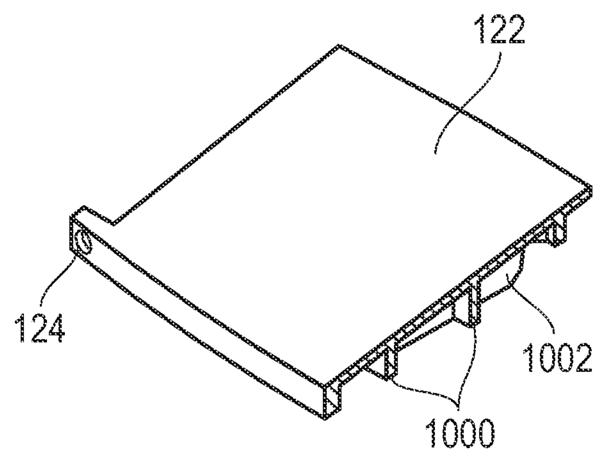
FIG. 10 is view in section taken along line 10-10 in FIG. 9.

FIGS. 9 and 10 show base access panel 122 separate from gaming machine 100. As best shown in the section view of FIG. 10 example base access panel 122 includes a series of internal structural ribs for improving the rigidity. The example shows laterally extending ribs 1000 and longitudinally extending ribs 1002. Additional laterally extending ribs and longitudinally extending ribs may be included in base access panel 122 beyond those shown in the section view of FIG. 10.

Figure 11:
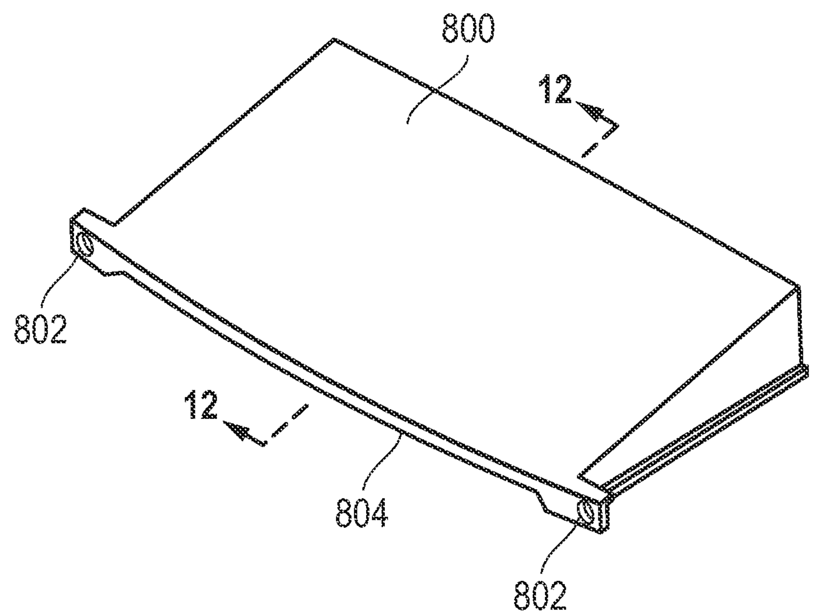
FIG. 11 is an isometric view of the sled cover shown in FIG. 8.
Figure 12:
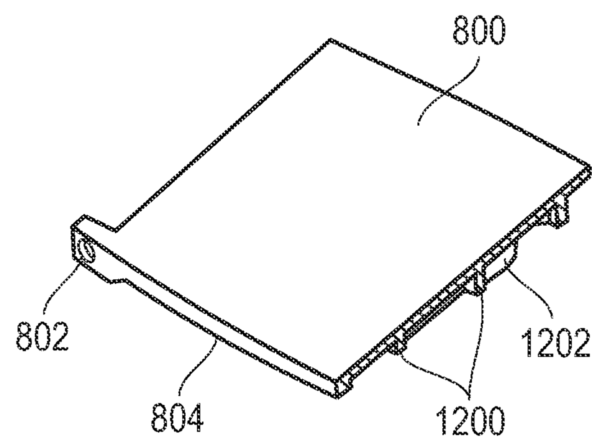
FIG. 12 is a view in section taken along line 12-12 in FIG. 11.

FIGS. 11 and 12 show the example sled cover 800 described above in connection with FIG. 8. As shown in the section view of FIG. 12 sled cover 800 includes structural ribs similar to those for base access panel 122. In particular sled cover 800 includes laterally extending ribs 1200 and longitudinal ribs 1202. As with base access panel 122, any suitable rib structure or any other structure features may be included in sled cover 800 to improve rigidity or otherwise improve the structure.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above-described representative embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A chair sled attachment assembly for a gaming machine that includes a cabinet having a secure access arrangement for providing access to a secure volume of the cabinet, the chair sled attachment assembly including:

(a) a base structure connected to the cabinet in a base position projecting in a front direction from a front side of the cabinet, the base structure defining a base volume separate from the secure volume of the cabinet and a base access opening;

(b) a support bracket located within the base volume adjacent to the base access opening, the support bracket including a support bracket connecting arrangement to which a chair sled receiver is connectable in a chair sled receiver operating position; and (c) a base access panel removably secured to the base structure in a cover position substantially covering the base access opening.

2. The chair sled attachment assembly of claim 1 further including an access panel brace and wherein the support bracket connecting arrangement is adapted to connect to the access panel brace alternatively to the chair sled receiver.

3. The chair sled attachment assembly of claim 2 wherein the access panel brace includes a bracing member that projects in the front direction from the support bracket when the access panel brace in connected to the support bracket connecting arrangement.

4. The chair sled attachment assembly of claim 1 wherein the chair sled receiver is connectable to the support bracket connecting arrangement through a receiver adapter.

5. The chair sled attachment assembly of claim 1 further including a sled cover adapted to be removably secured to the base structure in a sled cover position covering at least a portion of the base access opening when the chair sled receiver is connected in the chair sled receiver operating position.

6. The chair sled attachment assembly of claim 1 wherein the chair sled receiver protrudes from the base volume when connected in the chair sled receiver operating position.

7. The chair sled attachment assembly of claim 6 further including a sled cover adapted to be removably secured to the base structure in a sled cover position covering at least a portion of the base access opening when the chair sled receiver is connected in the chair sled receiver operating position, the sled cover in the sled covering position having a rear edge that substantially abuts a front edge of the chair sled receiver.

8. A gaming machine including:

(a) a cabinet having a secure access system for providing access to a secure volume of the cabinet;

(b) a base structure connected to the cabinet in a base position projecting in a front direction from a front side of the cabinet, the base structure defining a base volume separate from the secure volume of the cabinet and a base access opening;

(c) a support bracket located within the base volume adjacent to the base access opening, the support bracket including a support bracket connecting arrangement to which a chair sled receiver is connectable in a chair sled receiver operating position; and (d) a base access panel removably secured to the base structure in a cover position substantially covering the base access opening.

9. The gaming machine of claim 8 further including an access panel brace and wherein the support bracket connecting arrangement is adapted to connect to the access panel brace alternatively to the chair sled receiver.

10. The gaming machine of claim 9 wherein the access panel brace includes a bracing member that projects in the front direction from the support bracket when the access panel brace in connected to the support bracket connecting arrangement.

11. The gaming machine of claim 8 wherein the chair sled receiver is connectable to the support bracket connecting arrangement through a receiver adapter.

12. The gaming machine of claim 8 further including a sled cover adapted to be removably secured to the base structure in a sled cover position covering at least a portion of the base access opening when the chair sled receiver is connected in the chair sled receiver operating position.

13. The gaming machine of claim 8 wherein the chair sled receiver protrudes from the base volume when connected in the chair sled receiver operating position.

14. The gaming machine of claim 13 further including a sled cover adapted to be removably secured to the base structure in a sled cover position covering at least a portion of the base access opening when the chair sled receiver is connected in the chair sled receiver operating position, the sled cover in the sled cover position having a rear edge that substantially abuts a front edge of the chair sled receiver.

15. A method of attaching a chair sled to a gaming machine, the method including:

(a) removing a base access panel from a cover position on a base structure of a cabinet of the gaming machine, the cabinet having a secure access system for providing access to a secure volume of the cabinet, wherein the base structure projects in a front direction from a front side of the cabinet and defines a base volume separate from the secure volume;

(b) securing a chair sled receiver in a chair sled receiver operating position on a support bracket located within the base volume adjacent to a base access opening exposed by removing the base access panel;

(c) with the base access panel removed and the chair sled receiver in the chair sled receiver operating position, inserting a connecting end of the chair sled to a locked position within the chair sled receiver; and (d) securing a sled cover over at least a portion of the base access opening.

16. The method of claim 15 further including removing an access panel brace from the support bracket prior to securing the chair sled receiver.

17. The method of claim 16 wherein securing the chair sled receiver in the chair sled receiver operating position includes first securing a receiver adapter bracket to the support bracket.

* * * * *